US009483832B2

(12) United States Patent
Itai

(10) Patent No.: US 9,483,832 B2
(45) Date of Patent: Nov. 1, 2016

(54) SURGERY ASSISTANCE APPARATUS AND METHOD, AND NON-TRANSITORY RECORDING MEDIUM HAVING STORED THEREIN SURGERY ASSISTANCE PROGRAM

(71) Applicant: FUJIFILM Corporation, Tokyo (JP)

(72) Inventor: Yoshinori Itai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/859,957

(22) Filed: Sep. 21, 2015

(65) Prior Publication Data

US 2016/0012605 A1    Jan. 14, 2016

Related U.S. Application Data

(63) Continuation of application No. PCT/JP2014/000358, filed on Jan. 24, 2014.

(30) Foreign Application Priority Data

Mar. 25, 2013    (JP) ................................. 2013-061236

(51) Int. Cl.
*G06K 9/00* (2006.01)
*G06T 7/00* (2006.01)
*G06K 9/46* (2006.01)

(52) U.S. Cl.
CPC .......... *G06T 7/0081* (2013.01); *G06K 9/4604* (2013.01); *G06T 7/0093* (2013.01); *G06T 2200/04* (2013.01); *G06T 2207/10072* (2013.01);

(Continued)

(58) Field of Classification Search
CPC combination set(s) only.
See application file for complete search history.

(56) References Cited

U.S. PATENT DOCUMENTS

| 5,768,405 A * | 6/1998 | Makram-Ebeid ..... G06T 7/0012 382/128 |
| 6,690,816 B2 * | 2/2004 | Aylward ............... G06T 7/0012 382/128 |

(Continued)

FOREIGN PATENT DOCUMENTS

| JP | 2005-124614 A | 5/2005 |
| JP | 2011-045448 A | 3/2011 |

(Continued)

OTHER PUBLICATIONS

International Preliminary Report on Patentability of PCT/JP2014/000358 dated Mar. 4, 2015.

(Continued)

*Primary Examiner* — Anand Bhatnagar
(74) *Attorney, Agent, or Firm* — Sughrue Mion, PLLC

(57) ABSTRACT

A surgery assistance apparatus includes an organ region extraction unit that extracts a tubular organ region from a three-dimensional image obtained by imaging a tubular organ and a blood vessel dominating the tubular organ, a region-of-interest setting unit that sets a region of interest in the tubular organ region, a blood vessel region extraction unit that extracts a blood vessel region dominating the tubular organ from the three-dimensional image, a branching structure extraction unit that extracts a branching structure of the blood vessel from the blood vessel region, and a dominating blood vessel identification unit that identifies a dominating blood vessel region in the blood vessel region that dominates the region of interest by using a positional relationship between a terminal end point of the extracted branching structure and the set region of interest.

9 Claims, 4 Drawing Sheets

(52) U.S. Cl.
CPC ............... *G06T 2207/10081* (2013.01); *G06T 2207/30101* (2013.01)

(56) References Cited

U.S. PATENT DOCUMENTS

| | | | | |
|---|---|---|---|---|
| 6,782,284 | B1* | 8/2004 | Subramanyan | G06T 7/0012 378/21 |
| 7,639,855 | B2* | 12/2009 | Matsumoto | G06T 7/60 382/131 |
| 7,742,629 | B2* | 6/2010 | Zarkh | G06T 7/0067 345/419 |
| 8,086,000 | B2* | 12/2011 | Weijers | G06T 7/0012 382/128 |
| 8,155,411 | B2* | 4/2012 | Hof | G06T 7/0012 382/128 |
| 8,290,228 | B2* | 10/2012 | Cohen | G06T 7/0022 382/128 |
| 9,216,065 | B2* | 12/2015 | Cohen | G06T 7/0022 |
| 2007/0116342 | A1* | 5/2007 | Zarkh | G06T 7/0067 382/130 |
| 2010/0222671 | A1* | 9/2010 | Cohen | G06T 7/0022 600/424 |
| 2010/0290693 | A1* | 11/2010 | Cohen | G06T 7/0022 382/134 |
| 2011/0077462 | A1 | 3/2011 | Saitou et al. | |
| 2011/0237938 | A1* | 9/2011 | Mizuno | G06T 7/0012 600/425 |
| 2012/0209103 | A1* | 8/2012 | Sakuragi | G06T 7/0012 600/407 |
| 2013/0144160 | A1* | 6/2013 | Sakuragi | A61B 6/032 600/425 |

FOREIGN PATENT DOCUMENTS

| | | |
|---|---|---|
| JP | 2011-206186 A | 10/2011 |
| JP | 2011-218135 A | 11/2011 |
| JP | 2012-165910 A | 9/2012 |

OTHER PUBLICATIONS

International Search Report of PCT/JP2014/000358 dated Apr. 1, 2014.

Communication dated May 6, 2016, issued by the Japan Patent Office in corresponding Japanese Application No. 2013-061236.

* cited by examiner

SURGERY ASSISTANCE APPARATUS AND METHOD, AND NON-TRANSITORY RECORDING MEDIUM HAVING STORED THEREIN SURGERY ASSISTANCE PROGRAM

CROSS-REFERENCE TO RELATED APPLICATIONS

This application is a Continuation of PCT International Application No. PCT/JP2014/000358 filed on Jan. 24, 2014, which claims priority under 35 U.S.C. §119(a) to Japanese Patent Application No. 2013-061236 filed on Mar. 25, 2013. Each of the above applications is hereby expressly incorporated by reference, in its entirety, into the present application.

BACKGROUND

The present disclosure relates to a surgery assistance apparatus, method and program for assisting a doctor in determining a region to be excised when an excision is performed on a tubular organ, such as a large intestine and bronchi.

In medical fields, when a diseased part, such as a tumor, is excised in a surgery, the part to be excised is appropriately determined before the surgery by diagnosis based on images. For example, Japanese Unexamined Patent Publication No. 2005-124614 (Patent Document 1) proposes a technique for assisting by a computer. In Patent Document 1, a blood vessel branch that supplies nutrition to a diseased part is identified in a three-dimensional X-ray CT (Computed Tomography) image of a liver by identifying, based on three-dimensional distances between voxels constituting the liver parenchyma and voxels constituting blood vessels running in the liver, a voxel of the blood vessels dominating each of voxels of the liver parenchyma. Further, a set of voxels of the liver parenchyma dominated by the blood vessel branch is determined as a part to be excised.

SUMMARY

However, in the technique proposed in Patent Document 1, a voxel of a blood vessel dominating each of voxels of the liver parenchyma is identified by using a structural characteristic of the liver that a blood vessel dominating the organ, in other words, a blood vessel supplying oxygen and nutrition to the organ (hereinafter, referred to as "nutrition blood vessel") runs into the organ. Therefore, the technique is not applicable to an organ, such as a large intestine and bronchi, the nutrition blood vessel of which runs outside the organ. However, realization of an assistance technique by a computer that makes a dominating blood vessel corresponding to each position in the organ easily identifiable is expected to assist a doctor in determining a region to be excised also for the organ, such as the large intestine and bronchi.

In view of the foregoing circumstances, the present disclosure provides a surgery assistance apparatus, method and program that can assist a doctor in determining a region to be excised when an excision is performed on a tubular organ, such as a large intestine and bronchi.

To solve the aforementioned problem, a surgery assistance apparatus of the present disclosure includes an organ region extraction means that extracts a tubular organ region from a three-dimensional image obtained by imaging a tubular organ and a blood vessel dominating the tubular organ, a blood vessel region extraction means that extracts a blood vessel region dominating the tubular organ from the three-dimensional image, a region-of-interest setting means that sets a region of interest in the extracted tubular organ region, a branching structure extraction means that extracts a branching structure of the blood vessel from the blood vessel region, and a dominating blood vessel identification means that identifies a dominating blood vessel region in the blood vessel region that dominates the region of interest by using a positional relationship between a terminal end point of the branching structure and the region of interest.

Here, the "tubular structure" refers to an organ having a tubular or sac-shaped form, and includes a stomach, a large intestine, a rectum, bronchi, a urinary bladder and the like. However, blood vessels are not included. Further, the expression "dominating the organ" means keeping the function of the organ normal by supplying oxygen and nutrition to the organ. Further, the expression "store a three-dimensional image" means storing image data representing the three-dimensional image.

Further, the expression "identifies a dominating blood vessel region in the blood vessel region that dominates the region of interest" means identifying at least a partial segment of a part of the whole blood vessel region extracted by the blood vessel extraction means, and the part dominating the region of interest. Further, the "terminal end point" means a terminal end or a point present within a range that may be substantially regarded as the terminal end. For example, a point within the range of 30 mm from a terminal end may be regarded as a terminal end point.

In the surgery assistance apparatus of the present disclosure, the dominating blood vessel identification means may identify a part of the blood vessel corresponding to a segment from an edge including a terminal end of the branching structure, and the terminal end being located within a predetermined distance from the region of interest, to a higher edge branching at least once to reach the edge including the terminal end, as the dominating blood vessel region. For example, a part of the blood vessel corresponding to a segment from an edge including a terminal end of the branching structure, and the terminal end being located within 30 mm from the region of interest, to a higher edge branching at least once to reach the edge including the terminal end may be identified, as the dominating blood vessel region. At this time, when there are two or more terminal ends of the branching structure within a predetermined distance from the region of interest, a whole part of the blood vessel region corresponding to segments from the terminal ends to edges branching at least once to reach the terminal ends, respectively, may be identified as the dominating blood vessel region.

The dominating blood vessel identification means may identify a part of the blood vessel corresponding to a segment from an edge including a terminal end of the branching structure, and the terminal end being located at a shortest distance from the region of interest, to a higher edge branching at least once to reach the edge including the terminal end, as the dominating blood vessel region. Here, in the branching structure, the "higher edge branching once to reach the edge" with respect to an arbitrary edge means an edge immediately before branching to the arbitrary edge. Further, the "higher edge branching n times to reach the edge" with respect to an arbitrary edge means an edge immediately before branching to a higher edge that branches n−1 times to reach the arbitrary edge.

The surgery assistance apparatus of the present disclosure may include an image generation means that generates, from the three-dimensional image, an image representing the identified dominating blood vessel region and a rest of the blood vessel region in a manner visually distinguishable from each other.

The surgery assistance apparatus of the present disclosure may include an image generation means that generates, from the three-dimensional image, an image representing a region from an upstream end of the identified dominating blood vessel region to all of terminal ends present after the upstream end branches last and a rest of the blood vessel region in a manner visually distinguishable from each other.

The surgery assistance apparatus of the present disclosure may include a parameter storage means that stores a number of times representing a higher rank used to identify the dominating blood vessel region, and the dominating blood vessel identification means may identify a part of the blood vessel region corresponding to a segment from an edge including a terminal end of the branching structure to a higher edge branching the number of times stored in the parameter storage means to reach the edge, as the dominating blood vessel region.

In the surgery assistance apparatus of the present disclosure, the region-of-interest setting means may receive specification of two arbitrary positions in the tubular organ region by a user, obtain cross sections of the tubular organ region passing through the specified two positions, respectively, and set a part of the tubular organ region between the cross sections, as the region of interest.

Here, the "cross sections of the tubular organ region" mean cross sections orthogonal to a center line. At this time, it is necessary that the two arbitrary positions in the tubular organ region are specified along the center line with an interval therebetween. When a region of interest is set in this manner, the "positional relationship of the terminal end point with the region of interest" includes a positional relationship with the region of interest itself, a positional relationship with a surface of the region of interest (a curved surface region), a positional relationship with a center line of the region of interest (a linear region) and the like.

The surgery assistance apparatus of the present disclosure may include a dominated region identification means that identifies, with respect to the region of the blood vessel region represented in such a manner to be visually distinguishable from the rest of the blood vessel region, a dominated region in the tubular organ region that is dominated by the region of the blood vessel region. Further, the image generation means may generate, from the three-dimensional image, the image representing also the identified dominated region in such a manner to be visually distinguishable from a rest of the tubular organ region.

A surgery assistance method of the present disclosure causes one or plural computers to execute a procedure performed by each means of the surgery assistance apparatus of the present disclosure.

A surgery assistance program of the present disclosure causes one or plural computers to function as each means of the surgery assistance apparatus of the present disclosure. This program is stored in a recording medium, such as a CD-ROM and a DVD, or stored in a storage attached to a server computer or a network storage in a downloadable manner, and provided for a user.

A surgery assistance apparatus, method and program of the present disclosure extracts a tubular organ region from a three-dimensional image obtained by imaging a tubular organ and a blood vessel dominating the tubular organ, sets a region of interest in the tubular organ region, extracts a blood vessel region dominating the tubular organ from the three-dimensional image, extracts a branching structure of the blood vessel from the blood vessel region, and identifies a dominating blood vessel region in the blood vessel region that dominates the region of interest by using a positional relationship between a terminal end point of the branching structure and the region of interest. A doctor can appropriately and easily determine, based on this identified dominating blood vessel region, a position of the blood vessel at which clipping or the like is to be performed in excision.

DESCRIPTION OF THE PREFERRED EMBODIMENTS

Figure 1:
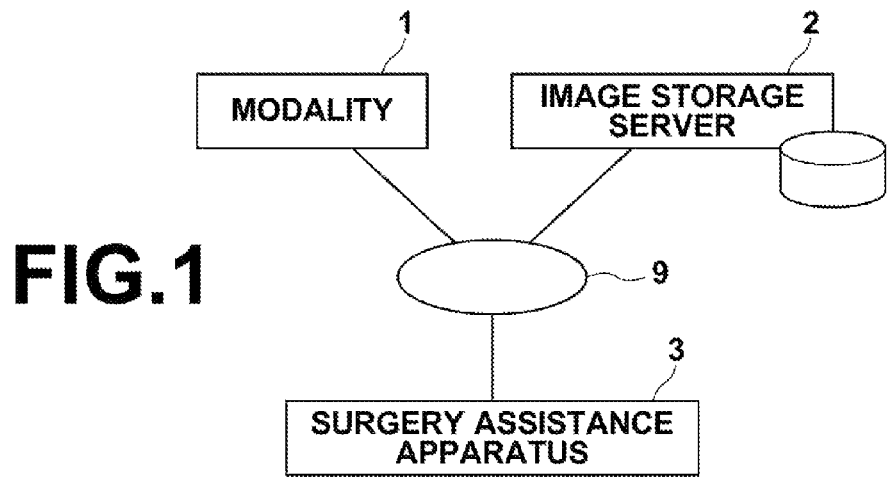
FIG. 1 is a schematic diagram illustrating the configuration of an image diagnosis assistance system to which a surgery assistance apparatus of the present disclosure has been introduced.

Hereinafter, an image diagnosis assistance system to which a surgery assistance apparatus according to an embodiment of the present disclosure has been introduced will be described. FIG. 1 is a schematic diagram illustrating the hardware configuration of this image diagnosis assistance system. As illustrated in FIG. 1, in this system, a modality 1, an image storage server 2 and a surgery assistance apparatus 3 are connected to each other through a network 9 in such a manner that they can communicate with each other.

The modality 1 is an apparatus that generates image data of a three-dimensional image representing a region to be examined of a subject by imaging the region, and outputs, as image information, the image data by attaching supplementary information defined in a standard, such as DICOM (Digital Imaging and Communications in Medicine), to the image data. Specific examples of the modality 1 are a CT (Computed Tomography) apparatus, an MRI (Magnetic Resonance Imaging) apparatus and the like.

The image storage server 2 is a computer that stores image data obtained at the modality 1 and image data generated by image processing at the surgery assistance apparatus 3 in an image database, and manages the image data. The image storage server 2 includes a large capacity external storage device and software for managing the database (for example, ORDB (Object Relational Database) management software).

The surgery assistance apparatus 3 is a computer including a central processing unit (CPU) and a storage, such as a semiconductor memory and a hard disk, an SSD (Solid State Drive) or the like in which a surgery assistance program according to an embodiment of the present disclosure has been installed. The surgery assistance program defines an organ region extraction procedure, a region-of-interest setting procedure, a blood vessel region extraction procedure, a branching structure extraction procedure, a dominating blood vessel identification procedure, an image generation procedure, a dominated region identification procedure and the like, as procedures to be executed by a CPU of a computer. Further, the surgery assistance apparatus 3 is connected to an input device, such as a mouse and a keyboard, and a display device, such as a display.

Figure 2:
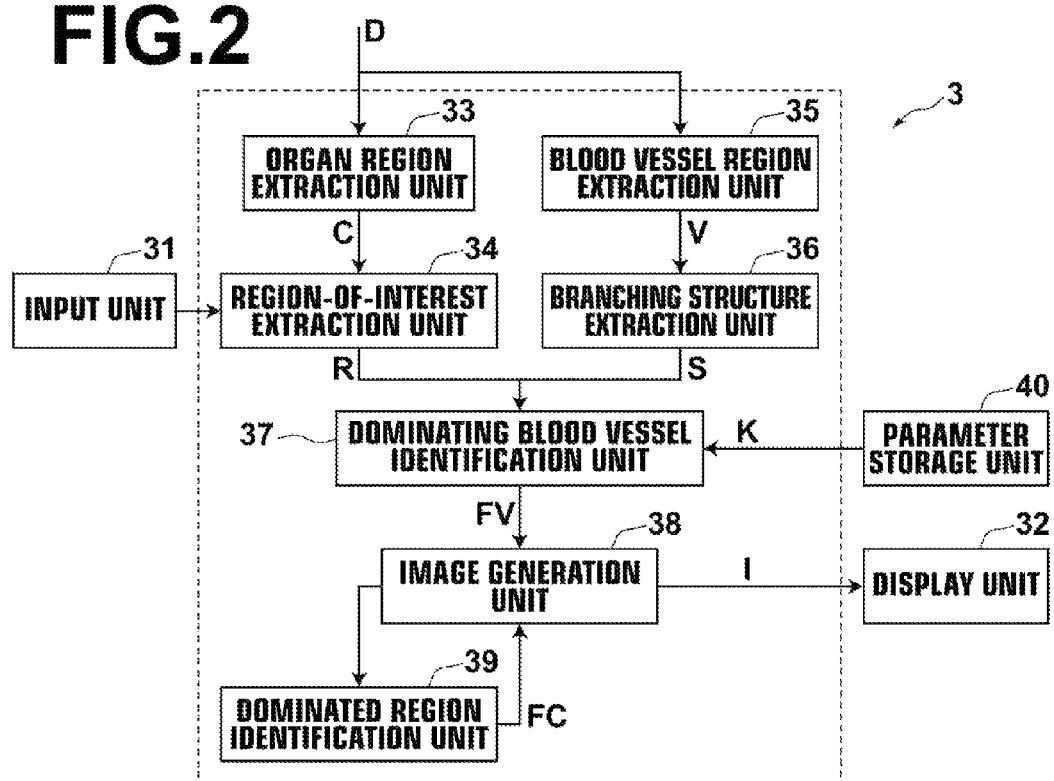
FIG. 2 is a functional block diagram of a surgery assistance apparatus according to an embodiment of the present disclosure.

FIG. 2 is a block diagram dividing the surgery assistance apparatus 3 at a function level. As illustrated in FIG. 2, the surgery assistance apparatus 3 includes an organ region extraction unit 33, a region-of-interest setting unit 34, a blood vessel region extraction unit 35, a branching structure extraction unit 36, a dominating blood vessel identification unit 37, an image generation unit 38, a dominated region identification unit 39, an input unit 31, an output unit 32 and a parameter storage unit 40. The function of each processing unit in the frame indicated by a broken line is achieved by execution of the surgery assistance program by the CPU. The input unit 31 is achieved by an input device, and the output unit 32 is achieved by an output device, and the parameter storage unit 40 is achieved by a storage.

The organ region extraction unit 33 receives three-dimensional image D, which was obtained by imaging target tubular organ C and a blood vessel dominating tubular organ C, and extracts a tubular organ region of a subject to be examined from three-dimensional image D. The tubular organ is, for example, a stomach, a large intestine, a rectum, bronchi, a urinary bladder, and the like. In the embodiment of the present disclosure, large intestine region C is extracted. As a method for extracting the large intestine region from the three-dimensional image, specifically, first, plural axial slice images are generated at cross sections (axial slice; axial) perpendicular to the body axis based on the three-dimensional image. Further, processing for separating an outside region of a body and an inside region of the body from each other with respect to the surface of the body is performed for each of the axial slice images by using a known method. For example, binarization processing is performed on the received axial slice images, and outlines are extracted by outline extraction processing, and an inside of the extracting outlines is extracted as the inside region (of a human body). Then, binarization processing based on a threshold is performed on the axial slice images of the inside region of the body, and a candidate for the large intestine region in each of the axial slice images is extracted. Specifically, binarization processing is performed by setting a threshold (for example, −600 or less) corresponding to the CT value of air, because air is present in the tube of the large intestine, and the air region in the inside region of the body is extracted, as the candidate for the large intestine region, from each of the axial slice images. Finally, the large intestine region is extracted by extracting only a part in which the extracted candidates for the large intestine in the body continue between pieces of the axial slice image data. Here, the method for extracting the large intestine region is not limited to the above method. Various other image processing methods, such as a Region Growing method and a Level Set method, may be used.

Figure 3:
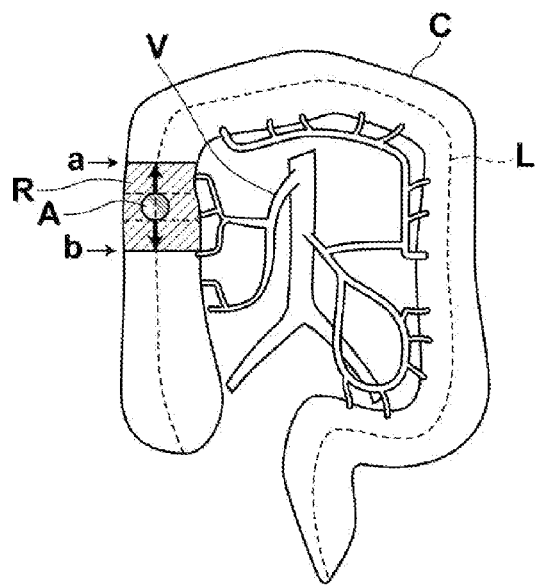
FIG. 3 is a schematic diagram illustrating processing for setting a region of interest in a large intestine region.

The region-of-interest setting unit 34 receives the tubular organ region extracted by the organ region extraction unit 33, and sets region of interest R in the tubular organ region. In the embodiment of the present disclosure, region of interest R is set in large intestine region C extracted as described above. For example, as illustrated in FIG. 3, lesion region A is manually or automatically identified in large intestine region C. Further, cross sections a, b of the tubular organ region passing through positions away from either end of lesion region A by a predetermined distance (for example, 30 mm) on center line L of large intestine region C, respectively, are obtained. A part of large intestine region C between the cross sections is set as region of interest R. Here, lesion region A may be automatically extracted by using a computer-aided diagnosis technique (CAD technique). Alternatively, lesion region A may be specified by a user in a two-dimensional tomographic image, a pseudo-three-dimensional image, a virtual endoscopic image or the like of the large intestine displayed on a display screen. Center line L may be extracted by thinning large intestine region C.

Figure 4:
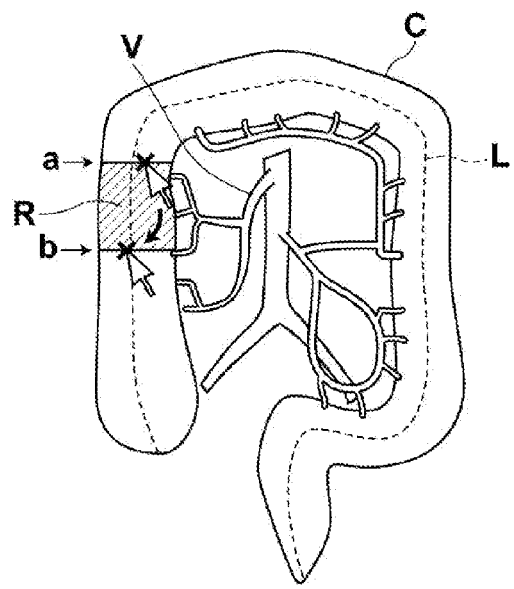
FIG. 4 is a schematic diagram illustrating processing for setting a region of interest in a large intestine region.

The method is not limited to the above method. For example, as illustrated in FIG. 4, the region-of-interest setting unit 34 may receive specification of two arbitrary positions in large intestine region C by a user at the input unit 31. Further, the region-of-interest setting unit 34 may obtain cross sections a, b of a tubular organ region passing through the specified two positions, respectively, and set a part of large intestine region C between cross sections a, b, as region of interest R.

The blood vessel region extraction unit 35 receives three-dimensional image D, and extracts blood vessel region V that dominates a target tubular organ from three-dimensional image D. For example, the blood vessel region extraction unit 35 may extract the blood vessel region from the target three-dimensional image by using a Region Growing method based on an arbitrary seed point set by the user in the blood vessel region. Here, the method for extracting the blood vessel region is not limited to the aforementioned method. Other various image processing methods, such as a threshold method and a Level Set method, may be used.

Figure 5:
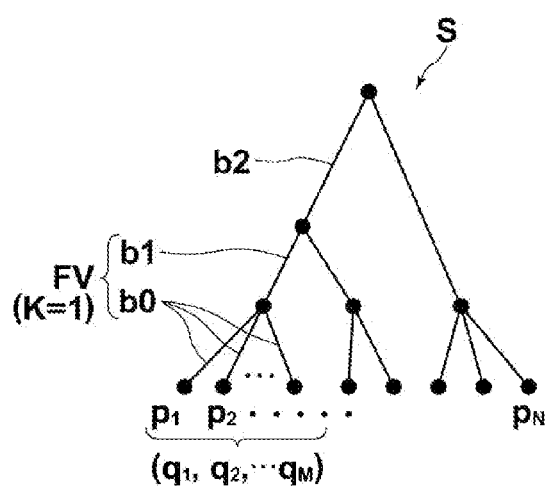
FIG. 5 is a diagram for explaining processing for identifying a dominating blood vessel region by using a branching structure of blood vessels.

The branching structure extraction unit 36 receives blood vessel region V extracted by the blood vessel region extraction unit 35, and extracts branching structure S of the blood vessel from blood vessel region V. For example, the branching structure extraction unit 36 performs thinning processing on the extracted blood vessel region. The branching structure extraction unit 36 extracts branching structure S (for example, a tree structure) of the blood vessel, as illustrated in FIG. 5, by classifying, based on the connection relationship of the obtained thin lines, voxels on the thin lines into an end point, an edge and a branching point. Further, feature values, such as the diameter of a blood vessel at each voxel on the thin lines and the length of each edge (blood vessel branch), may also be stored as branching structure data, if necessary.

The dominating blood vessel identification unit 37 identifies dominating blood vessel region FV in blood vessel region V that dominates region of interest R by using a positional relationship between a terminal end point of branching structure S, extracted by the branching structure extraction unit 36, and region of interest R, set by the region-of-interest setting unit 34. Specifically, the dominating blood vessel identification unit 37 checks, with respect to each of all terminal end points $p_1, p_2, \ldots p_N$ (N is a natural number) of branching structure S, whether each of the terminal end points is located within a predetermined distance (for example, 30 mm) from region of interest R, and thereby identifies terminal end points $q_1, q_2, \ldots q_M$ (M is a natural number less than or equal to N) within the predetermined distance from region of interest R. Further, the dominating blood vessel identification unit 37 identifies a part of the blood vessel region corresponding to a segment from an edge including each of terminal end points $q_1$, $q_2$, ... $q_M$ to a higher edge branching K times (K is a natural number greater than or equal to 1) to reach the edge including each of terminal end points $q_1$, $q_2$, ... $q_M$, as the dominating blood vessel region. Here, the value of K may be arbitrarily set or modified by the user. It is assumed that the value of K is set to a default value or a value specified by a user in advance, and that the set value of K is stored in the parameter storage unit 40.

For example, in the branching structure illustrated in FIG. 5, when the value of K has been set to 1, part FV of the blood vessel region corresponding to a segment from edge b0 including each of terminal end points $q_1$, $q_2$, ... $q_M$ to higher edge b1, which branches once to reach edge b0, is identified as the dominating blood vessel region. When the value of K has been set to 2, a part of the blood vessel region corresponding to a segment including edge b0, which includes each of terminal end points $q_1$, $q_2$, ... $q_M$, and higher edge b1, which branches once to reach edge b0, and additionally edge b2, which branches twice to reach edge b0, is identified as the dominating blood vessel region.

Figure 6:
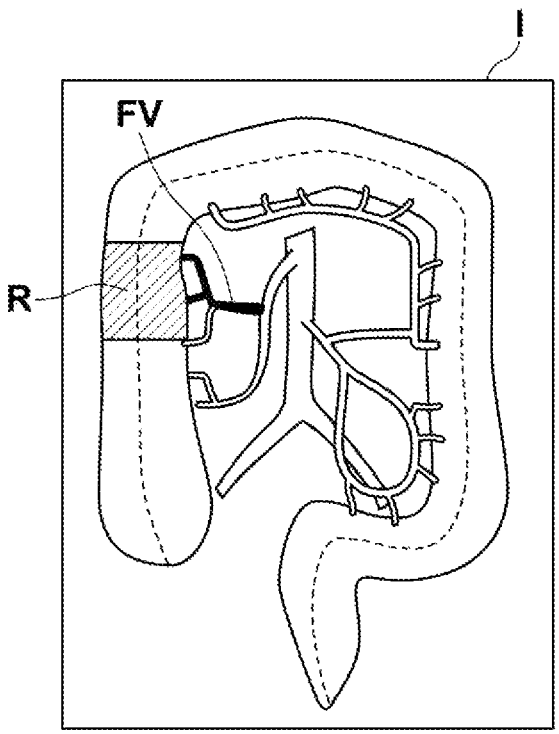
FIG. 6 is a diagram illustrating an example of a display image generated by an image generation unit.

The image generation unit 38 generates, from three-dimensional image D, display image I representing a region including at least region of interest R, dominating blood vessel region FV of region of interest R and a region around them in such a manner that dominating blood vessel region FV and the rest of blood vessel region V are visually distinguishable from each other. Specifically, mask data representing dominating blood vessel region FV and the rest of blood vessel region V, respectively, and templates defining colors and opacities of dominating blood vessel region FV and the rest of blood vessel region V are prepared in advance. Known volume rendering is performed on three-dimensional image D by using these mask data and templates, and thereby ray casting is performed on regions masked by the pieces of mask data, respectively, by using colors and opacities assigned to structures to be masked, respectively. Accordingly, display image I is generated. At this time, display image I may represent region of interest R and the rest of large intestine region C in a manner distinguishable from each other. FIG. 6 is a diagram illustrating an example of display image I that represents dominating blood vessel region FV and the rest of blood vessel region V in a manner visually distinguishable from each other, and also represents region of interest R and the rest of large intestine region C in a manner visually distinguishable from each other.

Figure 7:
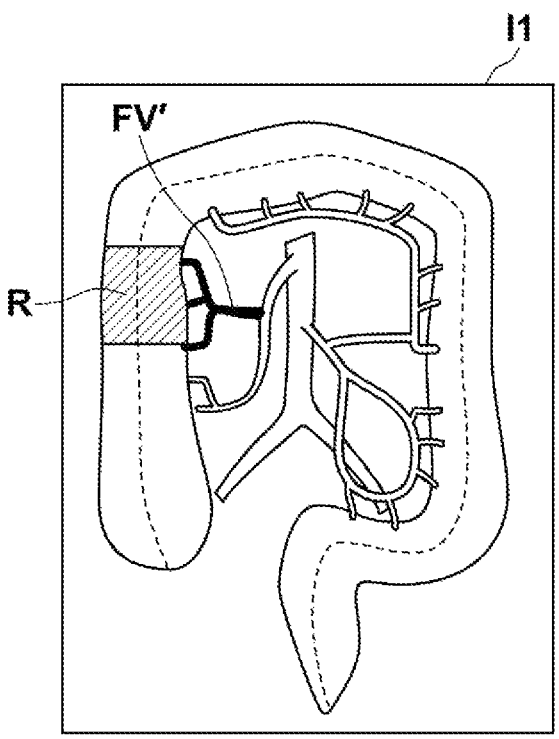
FIG. 7 is a diagram illustrating another example of a display image generated by the image generation unit.

Alternatively, the image generation unit 38 may generate display image I1 representing region FV' from an upstream end of dominating blood vessel region FV to all of terminal ends present after the upstream end branches last and the rest of blood vessel region V in a manner visually distinguishable from each other, as illustrated in FIG. 7.

Figure 8:
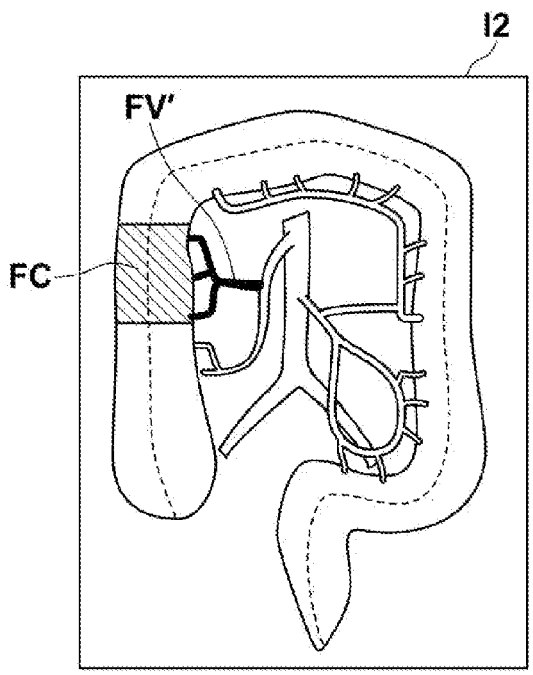
FIG. 8 is a diagram illustrating another example of a display image generated by the image generation unit.

Further, the image generation unit 38 may obtain, with respect to blood vessel region FV or FV' represented in a manner visually distinguishable as described above, dominated region FC in large intestine region C, which is dominated by blood vessel region FV or FV', from a dominated region identification unit 39, which will be described later. Further, the image generation unit 38 may generate display image I2, which represents dominated region FC and a rest of large intestine region C in a manner visually distinguishable from each other, as illustrated in FIG. 8.

The dominated region identification unit 39 identifies, with respect to an arbitrary partial blood vessel in blood vessel region V, a dominated region in large intestine region C dominated by the partial blood vessel by using a positional relationship between plural terminal end points present after an edge of the partial blood vessel branches last and large intestine region C.

For example, a corresponding point on center line L corresponding to each of plural terminal end points present after an edge of the partial blood vessel branches last is determined by using positional relationships between the plural terminal end points and center line L. Further, cross sections that pass through two outermost corresponding points of the determined plural corresponding points, respectively, or points in the vicinities of the outermost corresponding points, respectively, and that are orthogonal to the center line are obtained. Further, a part of the tubular organ region between the cross sections is identified as the dominated region. At this time, a corresponding point may be determined by obtaining a point on a surface of large intestine region C at a shortest distance from the target terminal end point, and by determining a point on a center line at a shortest distance from each of the obtained points, as the corresponding point. Alternatively, a point on a center line at a shortest distance from the target terminal end point may be determined, as a corresponding point corresponding to the terminal end point.

Figure 9:
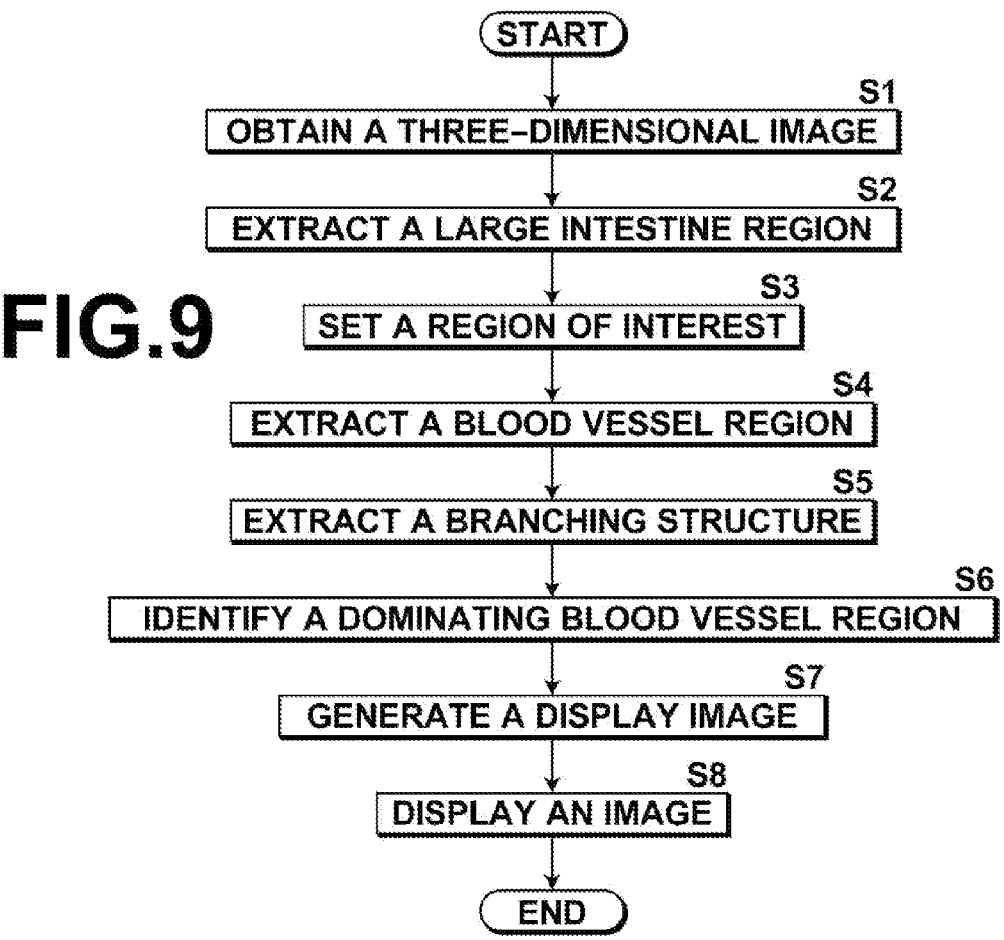
FIG. 9 is a flow chart showing a flow of processing performed in the image diagnosis assistance system.

Next, with reference to a flow chart illustrated in FIG. 9, an example of a flow of processing in the image diagnosis assistance system according to an embodiment of the present disclosure will be described. First, three-dimensional image D (image data) is obtained (S1). Here, three-dimensional image D has been obtained by imaging at the modality 1 based on an examination order from a doctor in a clinical department, who requested imaging, and stored in the image storage server 2. A user operates an operation terminal interface of a known ordering system installed in the surgery assistance apparatus 3, and requests obtainment of three-dimensional image D to be processed. The surgery assistance apparatus 3 sends, based on this operation, a request for retrieval of three-dimensional image D to the image storage server 2. The image storage server 2 obtains three-dimensional image D to be processed by retrieving three-dimensional image D from a database, and sends obtained three-dimensional image D to the surgery assistance apparatus 3. Then, the surgery assistance apparatus 3 obtains three-dimensional image D sent from the image storage server 2.

In the surgery assistance apparatus 3, the organ region extraction unit 33 receives three-dimensional image D, and extracts large intestine region C of a subject to be examined from three-dimensional image D (S2). The region-of-interest setting unit 34 receives specification of two arbitrary positions in large intestine region C by the user, and obtains cross sections a, b of a tubular organ structure passing through the specified two positions, respectively. Further, the region-of-interest setting unit 34 sets a part of large intestine region C between the cross sections, as region of interest R (S3). Meanwhile, the blood vessel region extraction unit 35 receives three-dimensional image D, and extracts blood vessel region V dominating the large intestine from three-dimensional image D (S4). Further, the branching structure extraction unit 36 extracts branching structure S of the blood vessel from extracted blood vessel region V (S5). Here, it is not always necessary that processing in these steps S2 and S3 and processing in these steps S4 and S5 are performed in the mentioned order. These kinds of processing may be performed simultaneously. Alternatively, processing in steps S4 and S5 may be performed first, and processing in steps S2 and S3 may be performed after then.

Then, the dominating blood vessel identification unit 37 checks, with respect to each of all terminal end points $p_1$, $p_2$, ... $p_N$ of branching structure S, whether each of the terminal end points is located within a predetermined distance from region of interest R, and thereby identifies terminal end points $q_1$, $q_2$, ... $q_M$ located within the predetermined distance. A part of the blood vessel region corresponding to a segment from an edge including each of terminal end points $q_1$, $q_2$, ... $q_M$ to a higher edge branching at least K times to reach the edge including terminal end points $q_1$, $q_2$, ... $q_M$, respectively, is identified as dominating blood vessel region FV (S6).

Further, the image generation unit 38 generates, from three-dimensional image D, display image I representing a region including at least region of interest R, dominating blood vessel region FV of region of interest R and a region around them in such a manner that dominating blood vessel region FV and the rest of blood vessel region V are visually distinguishable from each other (S7). Generated display image I is displayed on a display of the surgery assistance apparatus 3 (S8).

As described above, according to the surgery assistance apparatus 3 of the embodiment of the present disclosure, a dominating blood vessel region is identified with respect to a region of interest that has been set in such a manner to include a diseased part, such as a tumor, in a tubular organ region. The dominating blood vessel region is a region that dominates the region of interest (in other words, that supplies oxygen and nutrition). A doctor can appropriately and easily determine, based on this identified dominating blood vessel region, a position of the blood vessel at which clipping or the like is performed in excision.

In the aforementioned embodiment, a part of the blood vessel corresponding to a segment from an edge including a terminal end of branching structure S, and the terminal end being located within a predetermined distance from region of interest R, to a higher edge branching at least once to reach the edge including the terminal end, is identified as dominating blood vessel region FV. However, it is not necessary that such a region is identified as the dominating blood vessel region. A part of the blood vessel corresponding to a segment from an edge including a terminal end of branching structure S, and the terminal end being located at a shortest distance from region of interest R, to a higher edge branching at least once to reach the edge including the terminal end, may be identified as the dominating blood vessel region.

Further, in the aforementioned embodiment, a case in which the surgery assistance apparatus 3 includes the dominated region identification unit 39 was described. However, this configuration is not always necessary. The dominated region identification unit 39 should be provided, if necessary.

What is claimed is:

1. A surgery assistance apparatus comprising:
    an organ region extraction unit that extracts a tubular organ region from a three-dimensional image obtained by imaging a tubular organ and a blood vessel dominating the tubular organ;
    a blood vessel region extraction unit that extracts a blood vessel region dominating the tubular organ from the three-dimensional image;
    a region-of-interest setting unit that sets a region of interest in the extracted tubular organ region;
    a branching structure extraction unit that extracts a branching structure of the blood vessel from the extracted blood vessel region; and
    a dominating blood vessel identification unit that identifies a dominating blood vessel region in the blood vessel region that dominates the region of interest by using a positional relationship between a terminal end point of the extracted branching structure and the set region of interest,
    wherein the dominating blood vessel identification unit identifies a part of the blood vessel region corresponding to a segment from an edge including a terminal end of the branching structure, and the terminal end being located within a predetermined distance from the region of interest, to a higher edge branching at least once to reach the edge including the terminal end, as the dominating blood vessel region.

2. The surgery assistance apparatus, as defined in claim 1, the apparatus comprising:
    an image generation unit that generates, from the three-dimensional image, an image representing the identified dominating blood vessel region and a rest of the blood vessel region in a manner visually distinguishable from each other.

3. The surgery assistance apparatus, as defined in claim 2, the apparatus comprising:
    a dominated region identification unit that identifies, with respect to the region of the blood vessel region represented in such a manner to be visually distinguishable from the rest of the blood vessel region, a dominated region in the tubular organ region that is dominated by the region of the blood vessel region,
    wherein the image generation unit generates, from the three-dimensional image, the image representing also the identified dominated region in such a manner to be visually distinguishable from a rest of the tubular organ region.

4. The surgery assistance apparatus, as defined in claim 1, the apparatus comprising:
    an image generation unit that generates, from the three-dimensional image, an image representing a region from an upstream end of the identified dominating blood vessel region to all of terminal ends present after the upstream end branches last and a rest of the blood vessel region in a manner visually distinguishable from each other.

5. The surgery assistance apparatus, as defined in claim 4, the apparatus comprising:
    a dominated region identification unit that identifies, with respect to the region of the blood vessel region represented in such a manner to be visually distinguishable from the rest of the blood vessel region, a dominated region in the tubular organ region that is dominated by the region of the blood vessel region,
    wherein the image generation unit generates, from the three-dimensional image, the image representing also the identified dominated region in such a manner to be visually distinguishable from a rest of the tubular organ region.

6. The surgery assistance apparatus, as defined in claim 1, the apparatus comprising:
    a parameter storage unit that stores a number of times representing a higher rank used to identify the dominating blood vessel region,
    wherein the dominating blood vessel identification unit identifies a part of the blood vessel region corresponding to a segment from an edge including a terminal end of the branching structure to a higher edge branching the number of times stored in the parameter storage unit to reach the edge, as the dominating blood vessel region.

7. The surgery assistance apparatus, as defined in claim 1, wherein the region-of-interest setting unit receives specification of two arbitrary positions in the tubular organ region by a user, obtains cross sections of the tubular organ region passing through the specified two positions, respectively, and sets a part of the tubular organ region between the cross sections, as the region of interest.

8. A surgery assistance method causing one or a plurality of computers to execute:
   an organ region extraction procedure that extracts a tubular organ region from a three-dimensional image obtained by imaging a tubular organ and a blood vessel dominating the tubular organ;
   a blood vessel region extraction procedure that extracts a blood vessel region dominating the tubular organ from the three-dimensional image;
   a region-of-interest setting procedure that sets a region of interest in the extracted tubular organ region;
   a branching structure extraction procedure that extracts a branching structure of the blood vessel from the extracted blood vessel region; and
   a dominating blood vessel identification procedure that identifies a dominating blood vessel region in the blood vessel region that dominates the region of interest by using a positional relationship between a terminal end point of the extracted branching structure and the set region of interest,
   wherein the dominating blood vessel identification procedure identifies a part of the blood vessel region corresponding to a segment from an edge including a terminal end of the branching structure, and the terminal end being located within a predetermined distance from the region of interest, to a higher edge branching at least once to reach the edge including the terminal end, as the dominating blood vessel region.

9. A non-transitory computer-readable recording medium having stored therein a surgery assistance program causing one or a plurality of computers to function as:
   an organ region extraction unit that extracts a tubular organ region from a three-dimensional image obtained by imaging a tubular organ and a blood vessel dominating the tubular organ;
   a blood vessel region extraction unit that extracts a blood vessel region dominating the tubular organ from the three-dimensional image;
   a region-of-interest setting unit that sets a region of interest in the extracted tubular organ region;
   a branching structure extraction unit that extracts a branching structure of the blood vessel from the extracted blood vessel region; and
   a dominating blood vessel identification unit that identifies a dominating blood vessel region in the blood vessel region that dominates the region of interest by using a positional relationship between a terminal end point of the extracted branching structure and the set region of interest,
   wherein the dominating blood vessel identification unit identifies a part of the blood vessel region corresponding to a segment from an edge including a terminal end of the branching structure, and the terminal end being located within a predetermined distance from the region of interest, to a higher edge branching at least once to reach the edge including the terminal end, as the dominating blood vessel region.

* * * * *